United States Patent [19]
Isbister et al.

[11] 4,063,240
[45] Dec. 13, 1977

[54] ELECTRONIC DOCKING SYSTEM

[75] Inventors: Eric J. Isbister, Greenlawn, N.Y.;
Robert J. Klepach, Robert F. Riggs,
Terry A. Tucker, all of
Charlottesville, Va.

[73] Assignee: Sperry Rand Corporation, New York, N.Y.

[21] Appl. No.: 717,795

[22] Filed: Aug. 25, 1976

[51] Int. Cl.² .............................................. G01S 9/44
[52] U.S. Cl. ...................................... 343/9; 343/7.3;
343/112 S; 343/113 DE; 343/114.5
[58] Field of Search ................ 343/9, 112 S, 113 DE,
343/114.5, 7.3

[56] References Cited

U.S. PATENT DOCUMENTS

| | | | |
|---|---|---|---|
| 2,942,258 | 6/1960 | Priest | 343/114.5 |
| 3,120,000 | 1/1964 | Wilmotte | 343/112 S |
| 3,690,767 | 9/1972 | Missio et al. | 343/9 |
| 3,707,717 | 12/1972 | Frielinghaus | 343/9 |
| 3,772,693 | 11/1973 | Allard et al. | 343/9 |
| 3,772,697 | 11/1973 | Ross | 343/13 R |
| 3,845,481 | 10/1974 | Danzer et al. | 343/7.3 |

*Primary Examiner*—S. C. Buczinski
*Attorney, Agent, or Firm*—Howard P. Terry; Seymour Levine

[57] ABSTRACT

An electronic docking system utilizing a multiplicity of sensing subsystems to derive and display docking parameters during the docking operation is disclosed. The parameters displayed include bow and stern velocities ship's velocity perpendicular and parallel to the jetty and ship's orientation to the jetty during the docking maneuver. Parameters are derived from data gathered by sensors that include a receive only monopulse and a receive only doppler system which determine the angular position of a selected reference location aboard the ship and a signal with a frequency representative of the ship's velocity from a signal radiated from a beacon antenna aboard the ship. Range measurements are accomplished by utilizing baseband pulse radar systems capable of determining range to accuracies in the order of one foot. A telemetry link between the ship and the shore based system provides a means for simultaneously displaying data on board and on land and for relaying docking commands from the jetty master to the docking pilot.

9 Claims, 9 Drawing Figures

ELECTRONIC DOCKING SYSTEM

BACKGROUND OF THE INVENTION

1. Field of the Invention

This invention relates to instrumentation to aid a docking pilot in his endeavor to dock a large ship, and more specifically, to an electronic system employing a multiplicity of electronic subsystems operating in concert to quickly and efficiently provide information which the docking pilot requires during the approach, static alignment and terminal maneuver phases of the docking process.

2. Description of the Prior Art

The large masses, energies and momenta of large ships, the time lag in the perception of dynamic changes and the precision to which a large ship must be controlled, dictate the need for instruments to provide precision information to aid the docking pilot in the decision making process prior to the issuance of operational commands. Prior art devices and systems are limited in their capability and do not provide sufficient timely data to efficiently aid the docking pilot in his endeavors. Most systems, such as the docking sonar, are ship based and while the docking sonar offers the advantage of precision speed measurement without cooperative equipment ashore, the information from this subsystem does not include such data as orientation and distance to the jetty, which in the prior art are supplied by the human eye or ship's velocity normal to the jetty which may be supplied by a jetty based, side-looking sonar. Orientation and distance supplied by the human eye cannot be considered as precision data, and sonar signals from the ship based and jetty based sonar systems which provide velocity information may be lost because of air bubbles or mud swept into the sonar transmission path by the propellers of the ship or the tugs which provide the docking power. Replacement of the sonars with doppler radar systems will provide continuous velocity information but will still not supply the full complement of needed data. Various other devices, such as lasers, transponders, turn-rate gyros, precision hyperbolic navigators, and tellurometers have been considered for use in various systems, all of which have failed to supply the operational data required for efficient, safe, docking operations.

What is required to effectuate reliable and efficient docking of large ships is a combination of appropriate sensors which act in concert to provide raw docking data to a computer wherein this data is processed to provide meaningful display formats which are utilized in the decision making process or to provide automatic control signals for the tugs and other propulsion devices.

SUMMARY OF THE INVENTION

An electronic docking system embodying the principles of the present invention comprises on-board equipment which includes a hand carried communication and display unit and a beacon transmitter, jetty and shore based sensor systems data processing equipment, a display and control system and a communication-telemetry system. During the initial phases of the docking operation, the principal source of data is derived from a track-while-scan (TWS) radar which is included in the shore based sensors. This radar is operated from the Jetty Master's location and delivers raw radar data to the computer. The computer smooths the data, computes the ship's position and velocity relative to the jetty and provides this information to the displays included in the hand carried on-board equipment and shore based display and control systems. During normal operation, maneuvering data is automatically computed and relayed via the telemetry system to the shipboard display. In the event of a failure, a voice communication channel included in this system permits the maneuvering data to be verbally relayed to the docking pilot. This docking advisory data consists of speed, acceleration, deceleration and distance to important waypoints in addition to an indication of the safe speed limit as a function of distance to go.

As the ship approaches the jetty, the TWS radar ceases to supply reliable data necessitating the utilization of the jetty based sensor systems. These sensor systems include a means with which the precision measurements of range and aspect of the ship's hull is determined, a means for measuring speed parallel to the jetty and a means for determining the longitudinal offset between a fixed reference on the jetty and a reference location on the ship with which it is to be aligned. The data from these sensors is also processed by the computer and the information so derived is displayed in an appropriate format aboard the ship's and the Jetty Master's displays. The information displayed includes precision distances and speeds of bow and stern, turning rate, and parallel alignment.

DESCRIPTION OF THE PREFERRED EMBODIMENT

Figure 1:
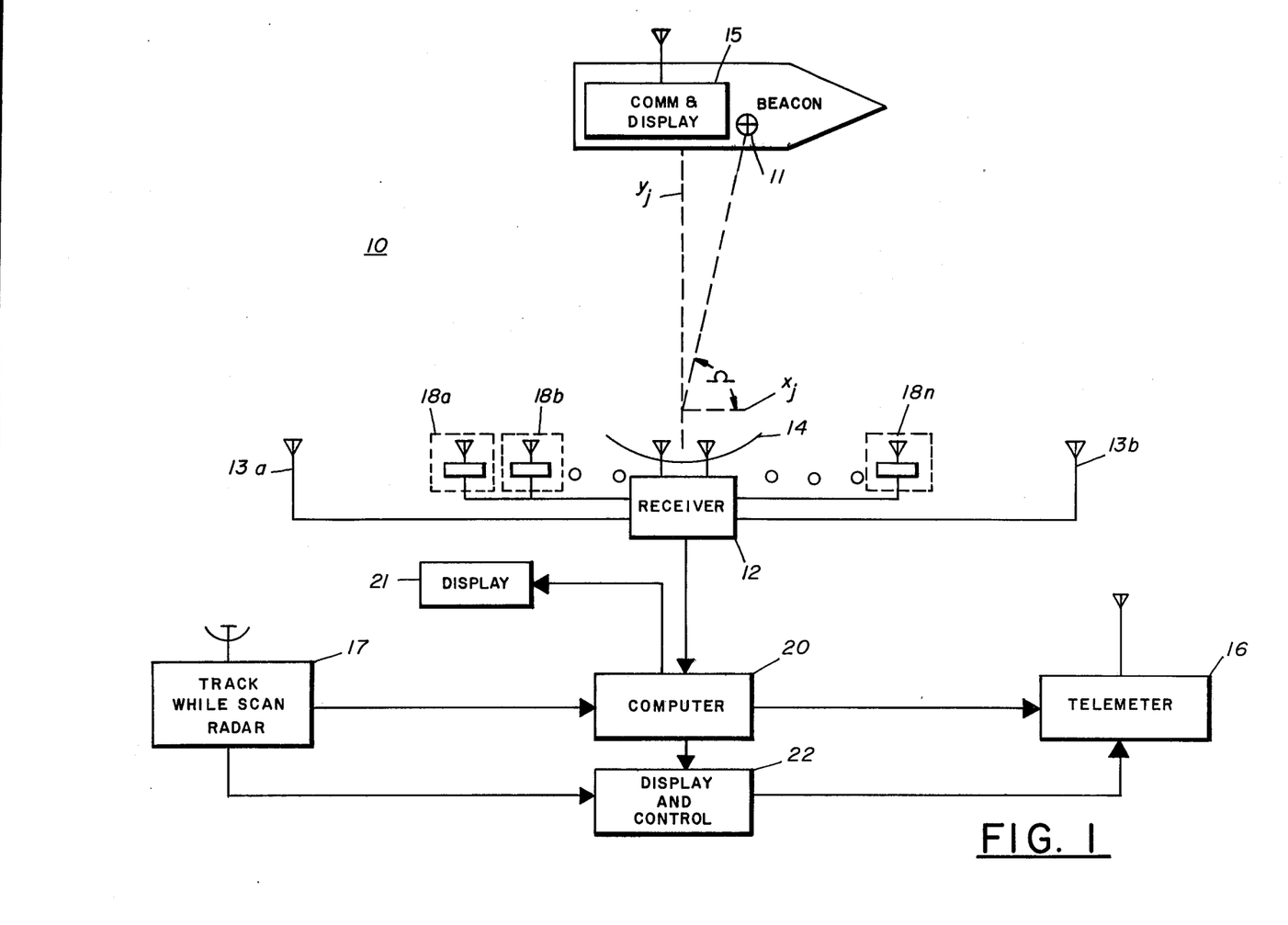
FIG. 1 is a block diagram illustrating an electronic docking system employing the principles of this invention.

In FIG. 1 an electronic docking system 10 includes a ship based CW beacon 11 which is coupled to a jetty-based receiver unit 12 via doppler system antennas 13a and 13b and monopulse radar receiver antenna 14, and a ship-based communications and display unit 15 which receives and appropriately displays data telemetered from a jetty-based telemetry unit 16. The communications and display unit 15 and the telemetry unit 16 also provide two-way voice communications between the ship and the jetty. A track-while-scan radar 17 monitors the ship's approach to the jetty while a multiplicity of radars capable of measuring range with accuracies in the order of one foot, 18a through 18n, provide precision short-range measurements during the docking maneuver. The data derived by the doppler system, the radar systems, the monopulse radar and the track-while-scan radar are coupled to a computer 20 wherein processing is performed and docking data derived. This docking data is coupled to the telemetry unit 16, which relays it to communications and display unit 15 on board ship, to a jetty display 21, and to a display and control unit 22 which displays the processed data and couples control information to the telemetry unit 16.

As the ship approaches the jetty for docking, the principal source of information is derived from the shore-based track-while-scan radar 17. This radar is operated from the Jetty Master's location and delivers estimates of the ship's position and velocity to the computer where the data is smoothed and computations made of the ship's deviation from a previously determined nominal trajectory. Information such as ship's position, velocity, acceleration along the nominal track and lateral deviation from the nominal track are telemetered or voice-communicated by the telemetry unit 16 to communications and the display unit 15 for immediate action or continuous display.

Figure 2A:
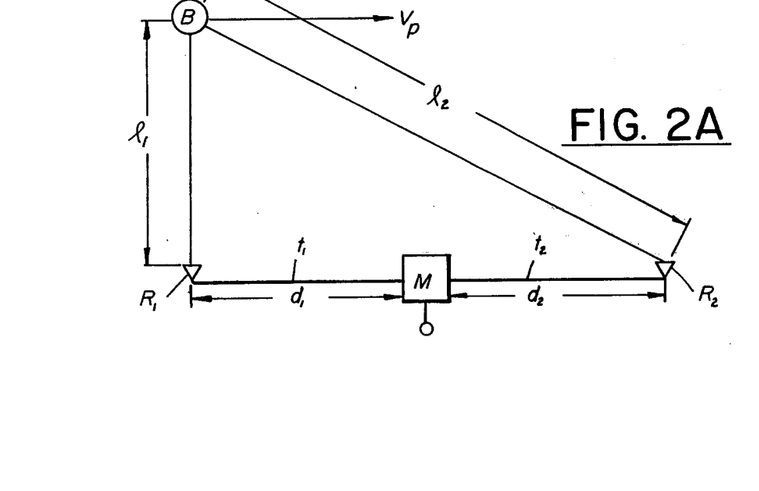
FIGS. 2a through 2d are line drawings useful in explaining the operation of the doppler subsystem of the invention.
Figure 2B:
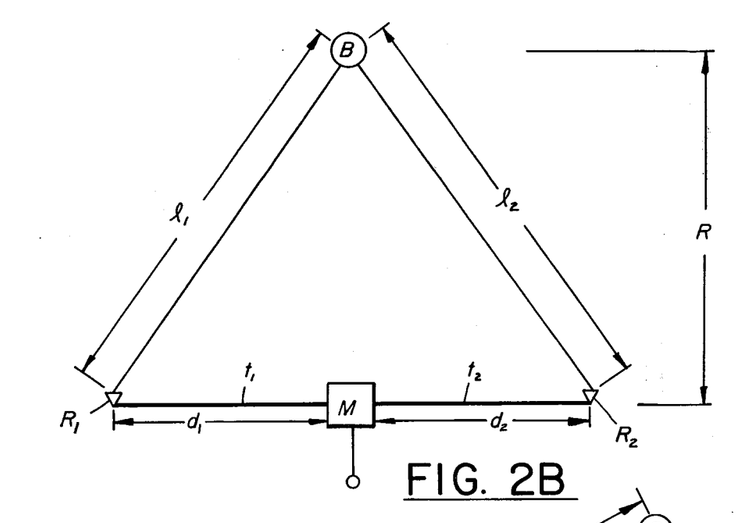
Figure 2C:
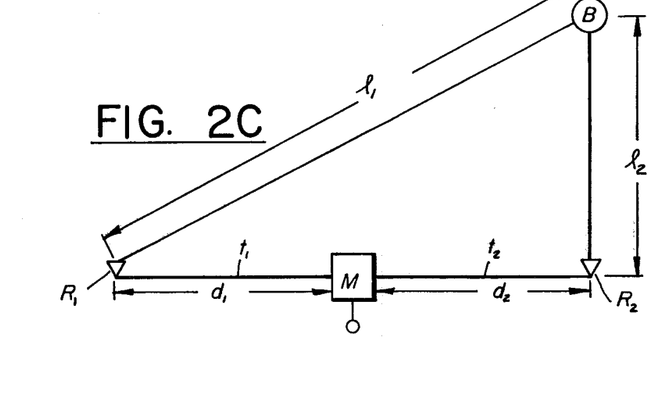
Figure 2D:
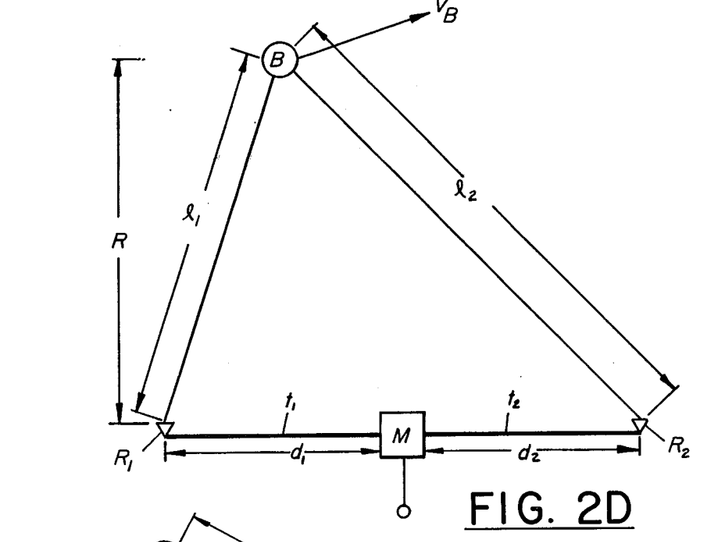

As the ship approaches the jetty, the TWS radar ceases to supply reliable data and the jetty based sensors, the doppler system which comprises antennas 13a and 13b and receiving circuitry in the receiver unit 12, monopulse radar which comprises antenna 14 and receiving circuitry in the receiving unit 12 and baseband radars 18a through 18n are then utilized. The doppler system, which is employed for measuring speed parallel to the jetty, differs from conventional doppler systems in that it derives a doppler signal from a moving active source, in this system the beacon 11, by receiving the signal radiated therefrom at two stationary locations, in contrast to the more conventional doppler systems wherein the reflected echo of a moving passive target is received at the position of the transmitted signal and the doppler frequency derived therefrom. Refer now to FIGS. 2a, 2b, and 2c wherein beacon B is shown moving with velocity $V_p$ parallel to the jetty at a distance R, wherein receiving antennas $R_1$ and $R_2$ are so positioned such that a line joining corresponding points on each antenna is parallel to the edge of the jetty. A transmission line $t_1$ of length $d_1$ couples receiving antenna $R_1$ to a mixer M and a transmission line $t_2$ of length $d_2$ couples the receiving antenna $R_2$ to mixer M. The beacon is located a distance $l_1$ from receiving antenna $R_1$ and a distance $l_2$ from receiving antenna $R_2$. The beacon signal radiates with a wavelength $\lambda$ and the signal received at receiving antenna $R_1$ completes approximately $(l_1 + d_1)/\lambda$ cycles when coupled to mixer M while the signal received at receiving antenna $R_2$ similarly completes $(l_2 + d_2)/\lambda$ cycles. When the beacon is approximately in line with receiving antenna $R_1$ as shown in FIG. 2a, the complete path length between the beacon and the mixer through receiving antenna $R_1$ is less than the complete path length between the beacon and the mixer through eceiving antenna $R_2$, when midway between receiving antennas $R_1$ and $R_2$, as shown in FIG. 2b, the total path lengths to the mixer are essentially equal, and when essentially in line with receiving antenna $R_2$, the path length between the beacon and the mixer through receiving antenna $R_1$ is greater than the path length between the beacon and the mixer through receiving antenna $R_2$. Consequently, as the beacon moves parallel to the jetty, there will be positions for which the signals arriving at the mixer from along the two paths are in phase coincidence, while at other positions they will be in antiphase coincidence. The mixer detects the degree of phase coincidence and generates a beat note or doppler whose frequency is proportional to the rapidity of the cyclic phase coincidence. For the more general case when the beacon is in motion in the direction not parallel to the jetty with parallel ($V_p$) and normal ($V_n$) velocity components, as shown in FIG. 2d, the doppler frequency $f_d$ derived by this system can be shown to be $$f_d = \frac{1}{\lambda} \left| V_p \left( \sqrt{1 - \left(\frac{R}{l_2}\right)^2} + \sqrt{1 - \left(\frac{R}{l_1}\right)^2} \right) + V_n \left( \frac{R}{l_2} - \frac{R}{l_1} \right) \right|$$

The direction of motion may be established by determining which of the two received signals possesses the higher frequency. The doppler system as described above has the capability of measuring very small velocities. As an example thereof, a beacon radiating at a 10 cm wavelength will experience a complete doppler cycle for a target motion of approximately 10 cm and target velocities in the order of one foot-per-minute are readily measurable.

The output of the doppler system is coupled to the computer 20 wherein it is utilized to determine the ship's velocity parallel to the jetty. However, as indicated in the above equation, other parameters, the derivations of which will be described subsequently, are required for this computation.

Figure 3:
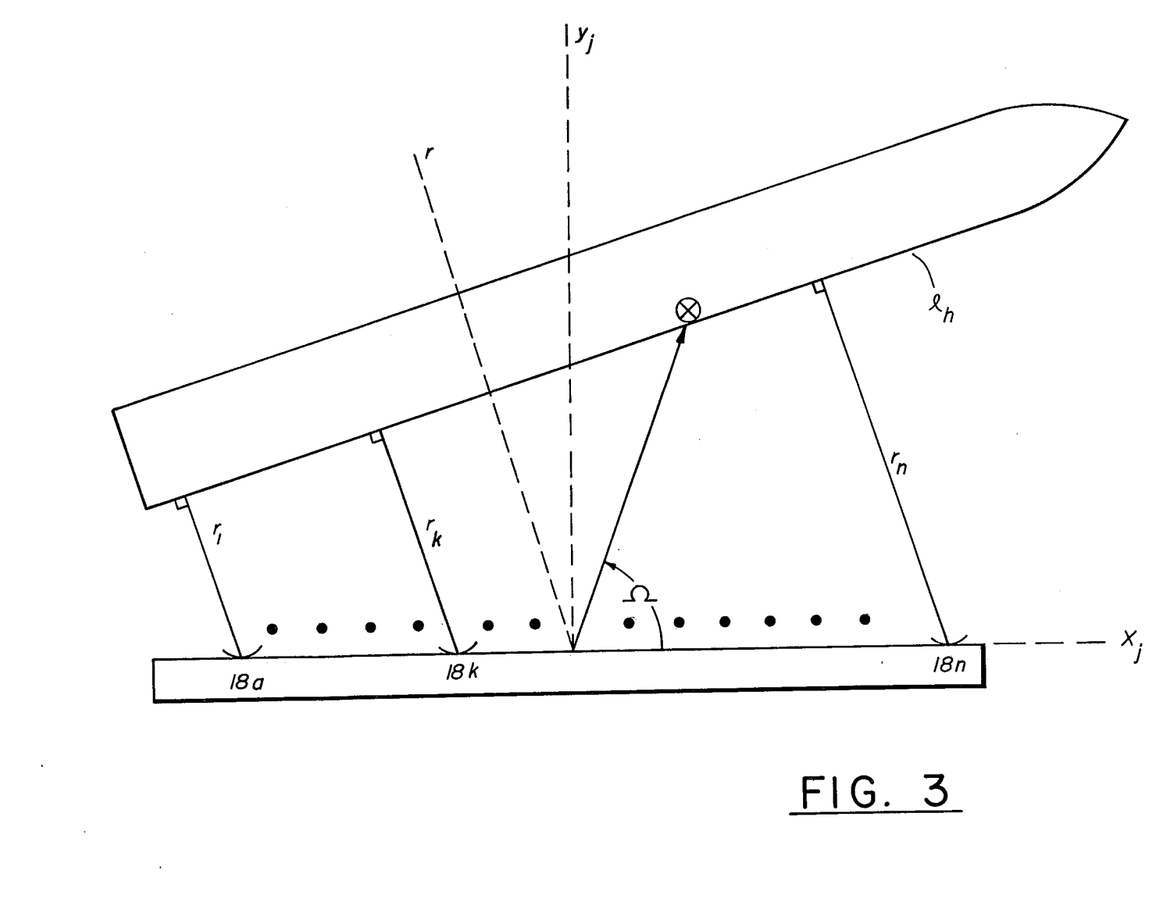
FIG. 3 is a block diagram of the central processing of the invention.

The highly accurate radars 18a through 18n in FIG. 1 may be baseband radars each having the capability of achieving range accuracies in the order of one foot. This radar may include a baseband pulse object sensor system of the type disclosed in U.S. Pat. No. 3,772,697 issued on Nov. 13, 1973, which may be coupled to a range measurement device such as that disclosed in U.S. Pat. No. 3,979,749 issued on Sept. 7, 1976, both patents issued to Gerald F. Ross and assigned to the Sperry Rand Corporation. A multiplicity of these baseband radar systems 18a through 18n are located along the jetty, each to determine a range to the ship's hull. Significantly, baseband pulse returns are from sections of the ship that are normal to the direction of propagation as shown in FIG. 3. These returns are used to determine the linear regression line of a ship in a coordinate system wherein the face of the jetty forms one axis $x_j$ and aperpendicular to the hull of the ship forms the other axis $r$. Range and range rate to the various sections of the ship's hull are determined in this coordinate system, then transformed into the jetty's $(x_j, y_j)$ coordinate system to determine range and perpendicular velocity of various locations of the ship's hull relative to the jetty. The details of these calculations will be more fully discussed when the computer 20 of FIG. 1 is described.

Refer again to FIG. 3. The linear regression, line of the hull, $l_h$, the perpendicular velocity and the angle $\Omega$, formed by the jetty and the line determined by the origin of the jetty's coordinate system and the point on the regression line $l_h$, signifying the position of the beacon, are utilized by the computer to determine the parallel velocity of the ship. The angle $\Omega$ is measured by the monopulse system 14 FIG. 1, yet to be described.

Refer once again to FIG. 1. The monopulse radar 14 is utilized to determine the angle $\Omega$ formed by the $x_j$ axis of the jetty's coordinate system and the line joining the origin thereof with the point on the hull signifying the beacon's location. Monopulse radar systems for deriving precise angular information are generally well known in the art and have been used extensively for deriving precise target angular locations. The application of the monopulse system in the invention utilizes only the receiver portion of the conventional monopulse radar systems, the radiation from the beacon supplying the signal to be tracked instead of the echo radiation from an illuminated target.

Figure 4:
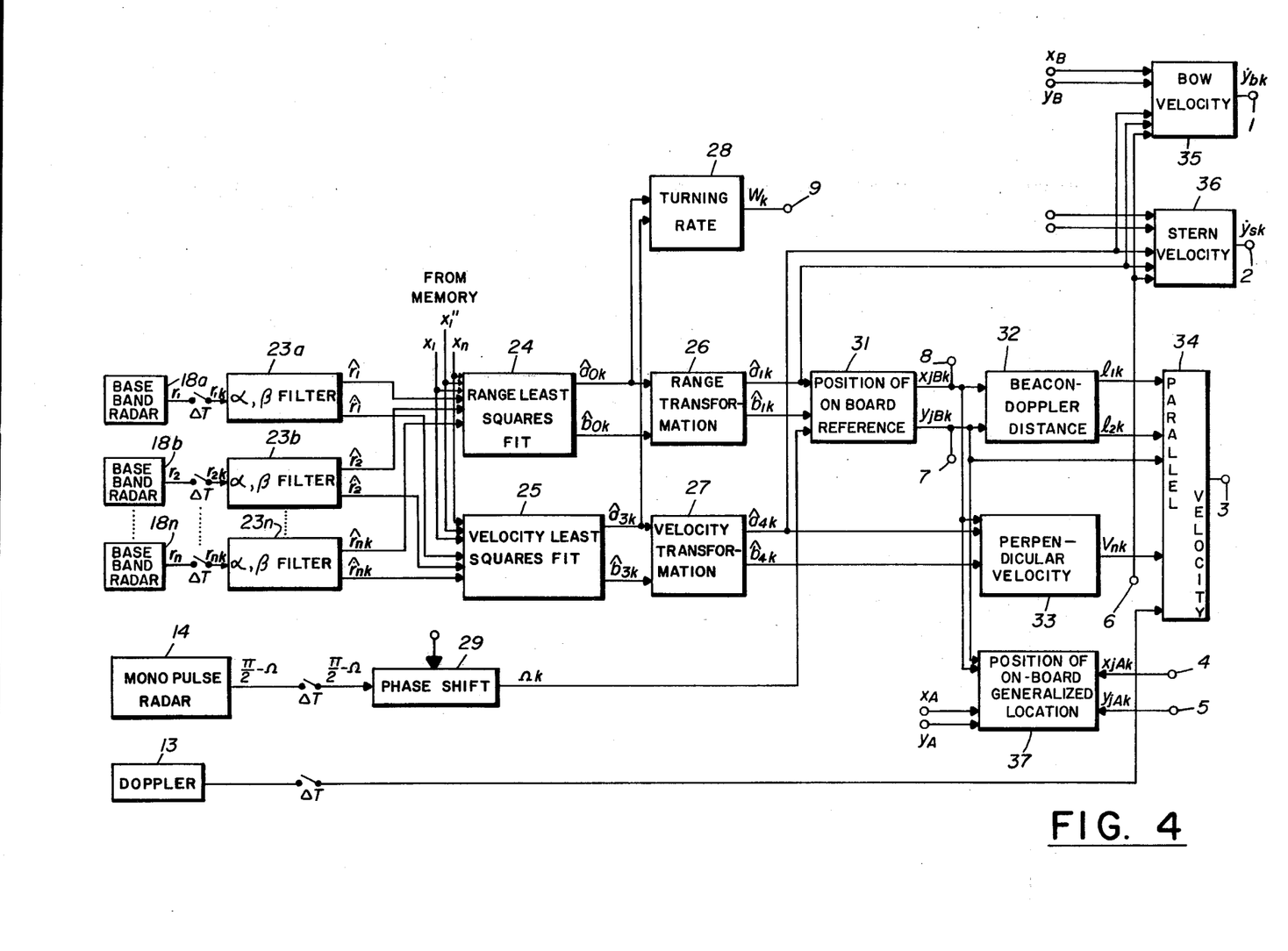
FIG. 4 is a block diagram of a computer for processing the sensor derived data during the docking operation.

Refer now to FIG. 4 wherein a block diagram of the invention's computer is shown. The range readings of each of the baseband radars 18a through 18n are sampled at time intervals $\Delta t$ which may be the interpulse period. The $k$th sampled ranges $r_{ik}$ through $r_{nk}$ are each coupled to alpha-beta $\alpha$-$\beta$ filters 23a through 23n, each having filter constants $\alpha$ and $\beta$, wherein the best estimates of range and range-rate are obtained for each of the baseband radars 18a through 18n. The estimate for the $k$th + 1 range $r_j(k+l)$ and the range $r_k(k+l)$ is obtained from the $k$th estimate of range $r_{jk}$ and range rate $\dot{r}_{jk}$ therefore in accordance with the following equations:

$$r_{j(k+1)} = r_{jk} + \alpha(r_{jk} - \hat{r}_{jk}) + \hat{\dot{r}}_{j(k+1)} \Delta t$$

$$\hat{\dot{r}}_{j(k+1)} = \hat{\dot{r}}_{jk} + \frac{\beta}{\Delta t}(r_{1k} - \hat{r}_{1k})$$

Upon completion of the computation, the $k$th + $l$ estimates are stored and the $k$th estimates of range and range rate of each of the $\alpha$-$\beta$ filters 23a through 23n are respectively coupled to circuits 24 and 25 to each of which the jetty locations $x_l$ through $x_n$ of the baseband radars, stored in the computer's memory (not shown), are also coupled. Circuits 24 and 25 respectively determine the least square fit to linear equations for range and range rate, computing each slope and intercept in accordance with the following equations:

$$\hat{a}_{0k} = \frac{n \sum_{i=1}^{n} \hat{r}_{ik} x_i - \sum_{i=1}^{n} \hat{r}_{ik} \sum_{i=1}^{n} x_i}{n \sum_{i=1}^{n} x_i^2 - \left(\sum_{i=1}^{n} x_i\right)^2}$$ (slope of linear range equation)

$$\hat{b}_{0k} = \frac{\sum_{i=1}^{n} \hat{r}_{ik} - \hat{a}_{0k} \sum_{i=1}^{n} x_i}{n}$$ (intercept of linear range equation)

$$\hat{a}_{3k} = \frac{n \sum_{i=1}^{n} \hat{\dot{r}}_{ik} x_i - \sum_{i=1}^{n} \hat{\dot{r}}_{ik} \sum_{i=1}^{n} x_i}{n \sum_{i=1}^{n} x_i^2 - \left(\sum_{i=1}^{n} x_i\right)^2}$$ (slope of linear range rate equation)

$$\hat{b}_{3k} = \frac{\sum_{i=1}^{n} \hat{\dot{r}}_{ik} - \hat{a}_{3k} \sum_{i=1}^{n} x_i}{n}$$ (intercept of linear range rate equation)

These linear equations are in the non-orthogonal coordinate system $(r, xj)$ and it is desired to obtain range and range rate in the jetty's $(x_j, y_j)$ coordinate system. To affect this the computed values $(\hat{a}_{0k}, \hat{b}_{0k}$ and $\hat{a}_{3k}, \hat{b}_{3k})$ are coupled to computation circuits 26 and 27 respectively wherein the transformed equations, slopes and intercepts, $(\hat{a}_{1k}, \hat{b}_{1k})$ for range and $(\hat{a}_{4k}, \hat{b}_{4k})$ for range rate, are computed therefrom in accordance with the following equations:

$$\hat{a}_{1k} = \frac{\hat{a}_{0k}}{\sqrt{1 - \hat{a}_{0k}^2}}$$

$$\hat{b}_{1k} = \frac{\hat{b}_{0k}}{\sqrt{1 - \hat{a}_{0k}^2}}$$

-continued $$\hat{a}_{4k} = \frac{\hat{a}_{3k}}{\sqrt{1 - \hat{a}_{3k}^2}}$$

$$\hat{b}_{4k} = \frac{\hat{b}_{4k}}{\sqrt{1 - \hat{a}_{3k}^2}}$$

The slopes $\hat{a}_{0k}$ and $\hat{a}_{3k}$ computed for the least square fit range equation and least square fit range rate equation in circuits 24 and 25 are also coupled to computation circuit 28 wherein the turning rate of regression line of the ship's hull $W_k$ is computed in accordance with:

$$W_k = \frac{\hat{a}_{3k}}{\sqrt{1 - \hat{a}_{0k}^2}}$$

$W_k$ is provided at output terminal 9 of the computer and is coupled to the display and control unit 22, to the display unit 21 and to the telemetry unit 16 for coupling to the communications and display unit 15 aboard ship.

The complement of the angle $\Omega$ measured by the monopulse radar 14 (FIG. 3) is sampled at the same rate as the range measurements of the baseband radars 18a through 18n. This sampled angular data is coupled to a phase shift network 29 where this complementary angle is subtracted from $\pi/2$ to obtain the sampled angle $\Omega_k$. This data is coupled to circuit 31 to which the slope and intercept values $a_{1k}$ and $b_{1k}$, computed in transformation circuit 26, are also coupled. This data is utilized to compute the position $(x_{jbk}, y_{jbk})$ of the beacon in the jetty's coordinates, which position is given by:

$$x_{bk} = \frac{\hat{b}_{1k}}{\tan \Omega_k - \hat{a}_{1k}}$$

$$y_{jbk} = \frac{\hat{b}_{1k}}{1 - \hat{a}_{1k} \text{ctn } \Omega_k}$$

Signals representative of $x_{jbk}$ and $y_{jbk}$ are coupled to the computer 1- output terminals 7 and 8 respectively from which they may be coupled to the display subsystem. The coordinates of the beacon position $(x_{jbk}, y_{jbk})$ relative to the jetty, computed in circuit 31, are provided at the computer output terminals 8 and 9 respectively for coupling to the system displays and are also coupled to computation circuit 32 wherein the distances $l_{1k}$ and $l_{2k}$ between the first and second doppler antennas and the beacon respectively, are computed from:

$$l_{1k} = \sqrt{(x_{jbk} - x_{01})^2 + y_{jbk}^2}$$

$$l_{2k} = \sqrt{(x_{jbk} - x_{02})^2 + y_{jbk}^2}$$

The locations $x_{01}$ and $x_{02}$ of the doppler receivers $R_1$ and $R_2$, on the jetty are constants stored in the computation circuit 32.

To compute the ship's velocity parallel $V_{pk}$ to the jetty, the values $l_{1k}$ and $l_{2k}$ are required, along with the perpendicular distance of the ship to the jetty, which is in the $y_{jbk}$ output of computation circuit 31. The ship's velocity perpendicular $V_{nk}$ to the jetty is determined in computation circuit 33 to which, the $\hat{a}_{4k}$ and $\hat{b}_{4k}$ outputs of computation circuit 27 and the $x_{jbk}$ output of computation circuit 31 are coupled. Computation circuit 33 computes the ship's velocity perpendicular to the jetty $V_{nk}$ from $$V_{nk} = \hat{a}_{4k} x_{jbk} + \hat{b}_{4k}$$

The computed value $v_{1k}$ is provided at computer output terminal 6 and may be coupled to the docking system's display therefrom. $V_{1k}$ is coupled to computation circuit 34, to which the outputs $l_{1k}$ and $l_{2k}$ of computation circuit 32, the output $y_{jbk}$ of computation circuit 31, and the sampled doppler frequency $f_{ok}$ from doppler system 13, are also coupled. Computation circuit 34 utilizes these values to determine the ship's velocity parallel to the jetty $V_{pk}$ from the following equation:

$$V_{pk} = \frac{\lambda f_{Dk} - V_{nk}\left(\frac{y_{jbk}}{l_{zk}} - \frac{y_{jbk}}{l_{ik}}\right)}{\sqrt{1 - \left(\frac{y_{jbk}}{l_{zk}}\right)^2} + \sqrt{1 - \left(\frac{y_{jbk}}{l_{ik}}\right)^2}}$$

where $\lambda$ is the wavelength of the beacon's radiated signal and is a stored constant in the computation circuit 34.

The output of computation circuit 34 is representative of a ship's velocity parallel to the jetty and is provided at the computer's output terminal 3 for coupling to the appropriate displays of the electronic docking system.

Also of interest to the Jetty Master and the docking pilot are the velocities of the bow and the stern, and at times the position relative to the jetty of a particular location aboard ship. The bow and stern velocity computations are performed in computation circuits 35 and 36, respectively, to each of which the $\hat{a}_{1k}$, the output of computation circuit 26 and $\hat{a}_{4k}$, the output of computation circuit 27, and the velocity perpendicular to the jetty output of computation circuit 33, are coupled. Also coupled to computation circuit 35, either from the computer storage or as an operator input, are the ship's coordinates of the bow $(x_b, y_b)$. Computation circuit 35 computes the velocity of the bow $y_{bk}$ from:

$$\dot{Y}_{bk} = \hat{a}_{4k}\left[\frac{X_b + Y_b \hat{a}_{ik}}{(1 + \hat{a}_{ik})^{3/2}}\right] + V_{nk}$$

and provides a signal representative thereof at the computer output terminal to be coupled to the docking systems display and control circuits. Also coupled to computation circuit 35, either from computer storage or as an operator input, are the ship's coordinates of the stern $(x_s, y_s)$. Computation circuit 36 determines the velocity of the stern $y_{sk}$ from:

$$\dot{Y}_{bk} = \hat{a}_{4k}\left[\frac{X_s + \hat{a}_{ik} Y_s}{(1 + \hat{a}_{ik})^{3/2}}\right] + V_{nk}$$

and provides a signal representative thereof at computer output terminal 2 for coupling to the display and control circuits. Computation circuit 37, to which the $x_{jbk}$ and $y_{jbk}$ outputs of computation circuit 31 are coupled along with the ship's coordinates $(x_a, y_a)$ of the desired location which are coupled either from the computer's memory system or as an operator input, computes $x_{jak}$ and $y_{jak}$, the coordinates of desired location in the jetty's coordinate system from:

$$X_{jak} = \frac{X_a - \hat{a}_{ik} Y_a}{\sqrt{1 + \hat{a}_{ik}^2}} + X_{jbk}$$

$$Y_{jak} = \frac{Y_a + \hat{a}_{ik} X_a}{\sqrt{1 + \hat{a}_{ik}^2}} + Y_{jbk}$$

Signals representative of these values are provided at computer output terminals 4 and 5 for coupling to the docking system's displays.

Though each block of the invention's computer described above may be implemented with either well known analog or digital circuitry, the computer 20 of FIG. 1 may also be implemented with a general purpose digital computer conventionally programmed in accordance with the equations specified above.

Figure 5:
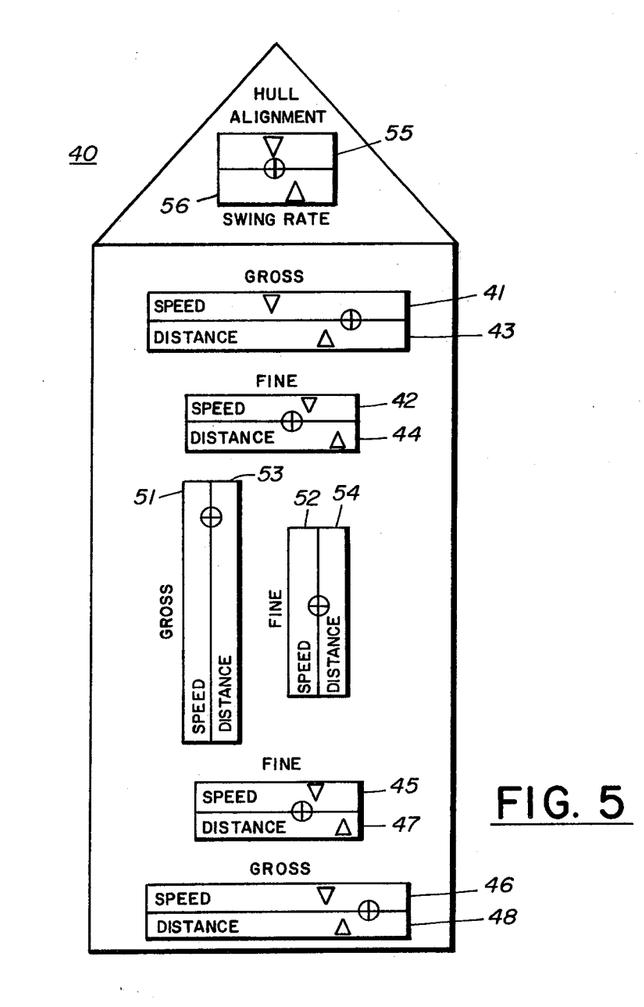
FIG. 5 is an illustration of a display format available aboard the docking ship.
Figure 6:
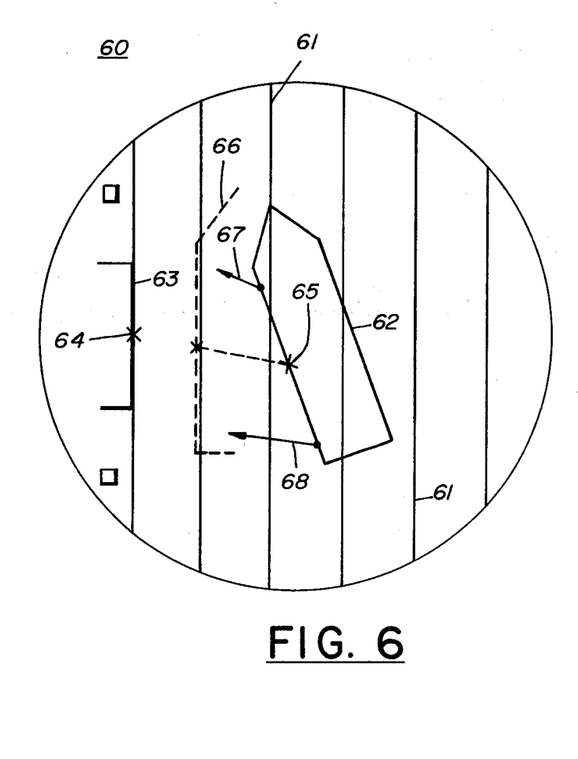
FIG. 6 is an illustration of display format available to the Jetty Master and useful in explaining the operation of the invention.

The display system of the invention may be comprised of a hand carried on-board display which is contained in the communication and display unit 15 of FIG. 1, the format of which is shown in FIG. 5; the Jetty Master's analog PPI display which is contained in the display and control unit 22 of FIG. 3, the format of which is shown in FIG. 6; a Jetty Master's alphanumeric display also contained in display and control unit of FIG. 5; and an IDASAT billboard type docking display, well known in the art, which may be the display unit 21 of FIG. 1. The hand carried on-board display shown in FIG. 5 provides gross and fine readouts of the bow's speed 41 and 42 respectively and gross and fine read-outs of the bow's distance 43 and 44 respectively. Similar information is provided for the ship's stern 45, 46, 47 and 48 and for speed and distance normal to the jetty 51, 52, 53 and 54. Also included on this display is the hull alignment 55, which is the deviation from parallel with respect to the jetty face, and the hull swing rate 56. Signals representative of these quantities are available at the computer output terminals 1–9 of FIG. 3. Output terminals 1 and 2 providing the bow and stern speeds while the distance of the bow and stern from the jetty may be obtained at output terminals 4 and 5 when the bow and stern ship's coordinates are coupled to computation circuit 37. Speed and distance normal to the jetty are available at output terminals 6 and 7 which provide signals which are representative of ship's velocity perpendicular to the jetty and the perpendicular distance to the jetty respectively. These signals are coupled from the computer to the telemetry unit 16 to be telemetered to the communications and display unit 15 aboard the ship. The hand carried on-board display may be similar to the docking display employed in the Gemini space program and described by W. W. Wigley in the Microwave Journal of June, 1965. The scales of the display may be logarithmic to provide the greatest sensitivity at the low readings. As noted in FIG. 4, the speed and distance scales may be back to back and these scales may be calibrated so that the reading of the speed indicator will always be less than the distance indicator when the rate of advance is within safe limits. If any speed becomes excessive an audible alarm may be sounded and a visual signal indicating the dangerous parameter may be presented to the operator.

To permit the jetty master to monitor the progress of the docking operation, a display such as that shown in FIG. 6 may be included in the display and control unit 22 of FIG. 1. This display provides range lines 61 parallel to the jetty and a ship's symbol 62. The bow and stern coordinates in the jetty's coordinate system coupled from output terminals 4 and 5 of computer 20 are utilized to orient the ship's symbol relative to the jetty 63 whereon an appropriate reference location is indicated 64. A corresponding alignment reference location 65 is indicated on the ship's symbol. A selective future predicted position 66 of the ship may also be displayed. To indicate the relative movement of the ship the signals representative of the bow and stern velocities coupled from the computer output terminals 1 and 2 are utilized to generate a bow velocity vector 67 and a stern velocity vector 68.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A system for deriving docking parameters during the operation of docking a ship to a jetty comprising:
    means for determining the angular position of a reference location in the coordinate frame of said jetty;
    means for determining the velocity of said reference location, means located at a multiplicity of predetermined locations along said jetty for measuring perpendicular range to a multiplicity of locations along the hull of said ship;
    means coupled to each of said range measurement means for providing a best estimate of range and range rate for each of said range measurements;
    means coupled to said best estimate means for determining a linear regression line for said hull of said ship in the coordinate frame of said jetty that provides a least squares fit for said best estimate for each of said perpendicular ranges;
    means coupled to said best estimate means for determining a linear function for said range rates in the coordinate frame of said jetty that provides a least squares fit for each best estimate of said range rate for each of said hull locations;
    means coupled to said linear regression determination means and said linear range rate determination means for determining the turning rate of said ship;
    means coupled to said linear regression determination means for determining the slope and intercept of said linear regression in said coordinates frame of said jetty;
    means coupled to said linear range rate function determination means for determining the slope and intercept of said linear function for said range rates in said coordinates frame of said jetty;
    means coupled to said linear regression line slope and intercept determination means and to said reference location angular position determination means for determining the coordinates of said reference source in said coordinate frame of said jetty;
    means coupled to said reference source coordinate determination means for determining the range between said reference source and said reference source range rate determination means;
    means coupled to said range rate slope and intercept determination means and to said reference source coordinate determination means for determining the velocity of said ship normal to said jetty; and
    means coupled to said reference location range rate determination means, to said normal range rate determination means, and to said means for determining the range between said reference source and said reference source range rate determination means for determining said ship's velocity parallel to said jetty.

2. A system for deriving docking parameters during a ship's docking operation in accordance with claim 1, wherein said reference location velocity determination means comprises:
    a radiating source located at a predetermined location on said ship;
    first antenna means located at a predetermined location on said jetty for receiving signals from said radiating source located on said ship;
    second antenna means located on said jetty at a predetermined distance from said first antenna means for receiving signals from said radiating source; and
    means coupled to said first and second antenna means for mixing said received signals to derive an output signal the frequency of which is a function of said ship's velocity.

3. A system for deriving docking parameters during a ship's docking operation in accordance with claim 1, wherein said reference location angular position determination means includes:
    a radiating source positioned at said reference location;
    monopulse antenna means located on said jetty for receiving signals from said radiating source; and
    receiver means coupled to said monopulse antenna means for providing a signal representative of the angle between the normal to said jetty and the location of said radiating source.

4. A system for deriving docking parameters during a ship's docking operation in accordance with claim 1, further including track-while-scan radar system means for deriving said docking parameters during the initial phases of said docking operation.

5. A system for deriving docking parameters during a ship's docking operation in accordance with claim 1, further including means for telemetering said docking parameters to said ship.

6. A system for deriving docking parameters in accordance with claim 1 further including means coupled to said normal velocity determination means, to said linear regression slope intercept determination means and to said range rate linear function slope intercept determination means for determining the bow and stern velocities of said ship.

7. A system for deriving docking parameters in accordance with claim 6 further including means coupled to said reference source determination means and to receive signals representative of a location in the coordinate frame of said ship for transforming said location into said coordinate frame of said ship to said coordinate frame of said jetty.

8. A system for deriving docking parameters during a ship's docking operation in accordance with claim 1 wherein each of said perpendicular range measurement means is a baseband radar.

9. A system for deriving docking parameters during a ship's docking operation in accordance with claim 1 wherein said best estimate means comprises a multiplicity of $\alpha$-$\beta$ filters each coupled to one of said range measurement means, each of said filters providing a best estimate of range and range rate for each of said range measurements.

* * * * *